United States Patent
Pruetz et al.

(10) Patent No.: US 11,226,202 B2
(45) Date of Patent: Jan. 18, 2022

(54) THREE-AXIS MICROMECHANICAL ROTATION RATE SENSOR SYSTEM INCLUDING LINEARLY AND ROTATORILY DRIVABLE SENSOR UNITS

(71) Applicant: Robert Bosch GmbH, Stuttgart (DE)

(72) Inventors: Odd-Axel Pruetz, Nuertingen (DE); Andreas Lassi, Korntal-Muenchingen (DE); Burkhard Kuhlmann, Reutlingen (DE); Jan-Timo Liewald, Kusterdingen (DE); Matthias Kuehnel, Boeblingen (DE); Niels Bode, Stuttgart (DE); Nils Felix Kuhlmann, Ehningen (DE); Peter Degenfeld-Schonburg, Renningen (DE); Reinhard Neul, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 28 days.

(21) Appl. No.: 16/640,882

(22) PCT Filed: Aug. 8, 2018

(86) PCT No.: PCT/EP2018/071565
§ 371 (c)(1),
(2) Date: Feb. 21, 2020

(87) PCT Pub. No.: WO2019/048171
PCT Pub. Date: Mar. 14, 2019

(65) Prior Publication Data
US 2020/0355500 A1 Nov. 12, 2020

(30) Foreign Application Priority Data
Sep. 5, 2017 (DE) .......................... 102017215503.5

(51) Int. Cl.
G01C 19/5712 (2012.01)
G01C 19/5755 (2012.01)
G01C 19/5747 (2012.01)

(52) U.S. Cl.
CPC ..... *G01C 19/5712* (2013.01); *G01C 19/5747* (2013.01); *G01C 19/5755* (2013.01)

(58) Field of Classification Search
CPC ............ G01C 19/5712; G01C 19/5755; G01C 19/5747; G01C 19/574; G01C 19/5762
See application file for complete search history.

(56) References Cited

U.S. PATENT DOCUMENTS

| 2011/0023600 A1* | 2/2011 | Wrede ................ G01C 19/5747 73/504.13 |
| 2011/0296913 A1* | 12/2011 | Ohms ................ G01C 19/5755 73/504.12 |

(Continued)

FOREIGN PATENT DOCUMENTS

| DE | 102009027897 A1 | 1/2011 |
| DE | 102010061755 A1 | 5/2012 |

(Continued)

OTHER PUBLICATIONS

International Search Report for PCT/EP2018/071565, dated Nov. 6, 2018.

*Primary Examiner* — Helen C Kwok
(74) *Attorney, Agent, or Firm* — Norton Rose Fulbright US LLP; Gerard Messina (57) ABSTRACT

A micromechanical rotation rate sensor system and a corresponding manufacturing method are described. The micromechanical rotation rate sensor system includes a first rotation rate sensor unit drivable rotatorily about a first axis in an oscillating manner for detecting a first outside rotation rate about a second axis and a second outside rotation rate about a third axis, the first, second and third axes being (Continued)

situated perpendicularly to one another, and a second rotation rate sensor unit linearly drivable by a drive unit along the second axis in an oscillating manner for detecting a third outside rotation rate about the first axis. The second rotation rate sensor unit is connected to the first rotation rate sensor unit via a first coupling unit for driving the first rotation rate sensor unit by the drive unit.

15 Claims, 5 Drawing Sheets

(56) References Cited

U.S. PATENT DOCUMENTS

| | | | | |
|---|---|---|---|---|
| 2013/0298672 | A1* | 11/2013 | Kuhlmann | G01C 19/5747 73/504.12 |
| 2013/0340522 | A1* | 12/2013 | Kuhlmann | G01C 19/5747 73/504.12 |
| 2014/0373628 | A1* | 12/2014 | Balslink | G01C 19/5769 73/504.12 |
| 2018/0231381 | A1* | 8/2018 | Lassl | G01C 19/5747 |
| 2019/0078887 | A1* | 3/2019 | Bode | G01C 19/5762 |
| 2020/0370888 | A1* | 11/2020 | Degenfeld-Schonburg | G01C 19/574 |

FOREIGN PATENT DOCUMENTS

| | | |
|---|---|---|
| DE | 102010062095 A1 | 5/2012 |
| WO | 9639615 A1 | 12/1996 |

* cited by examiner

THREE-AXIS MICROMECHANICAL ROTATION RATE SENSOR SYSTEM INCLUDING LINEARLY AND ROTATORILY DRIVABLE SENSOR UNITS

FIELD

The present invention relates to a micromechanical rotation rate sensor system and to a corresponding manufacturing method.

BACKGROUND INFORMATION

Even though arbitrary micromechanical components may also be used, the present invention and the problem underlying it are explained based on micromechanical rotation rate sensor systems for motor vehicles.

While the use of three-axis rotation rate sensors is customary in the field of consumer electronics, single-axis rotation rate sensors are typically used for automotive applications.

More complex automotive applications, such as inertial navigation for automated driving or for satellite-based navigation, position determination of camera- or LIDAR-based surroundings sensor systems, or also two-wheel applications, require robust three-axis rotation rate sensors.

German Patent Application No. DE 10 2010 062 095 A1 and PCT Application No. WO 96/39615 describe two-axis rotation rate sensor units including two rotor units, which are drivable about a first axis out of phase in an oscillating manner and are anti-symmetrically tiltable about a second and a third axis.

German Patent Application No. DE 10 2010 061 755 A1 describes a rotation rate sensor including a first Coriolis element, a second Coriolis element, a third Coriolis element, and a fourth Coriolis element, the first Coriolis element and the fourth Coriolis element being drivable in the same direction in parallel to a second axis extending in parallel to the main extension plane and perpendicularly to the first axis, and the first and second Coriolis elements being drivable in opposite directions in parallel to the second axis, and the first Coriolis element and the third Coriolis element being drivable in opposite directions in parallel to the second axis.

SUMMARY

The present invention provides a micromechanical rotation rate sensor system and a corresponding manufacturing method.

Preferred refinements of the present invention are described herein.

In accordance with example embodiments of the present invention, a one-axis and a two-axis rotation rate sensor are connected via a shared drive mechanism. The resulting three-axis rotation rate sensor is robust with respect to outside linear and rotational acceleration so that, in particular, the requirements for safety-relevant applications in the automotive environment are met.

An example micromechanical rotation rate sensor system according to the present invention including the shared drive mechanism for all three measuring axes offers multiple advantages compared to three individual rotation rate sensors. Since there is only one drive mechanism, it is possible to save drive structures and connecting pads and the associated wirings in the sensor core. In this way, the ASIC may also have a compact design since only one drive control loop has to be provided. The avoidance of different drive frequencies for the different rotation rate sensors is particularly advantageous, so that a mutual influence, e.g., due to parasitic crosstalk of the driving forces, may be avoided. Moreover, the packaging is simpler, and potential malpositions of the individual rotation rate sensors with respect to one another are precluded by the design of the rotation rate sensor system according to the present invention.

It is possible to avoid spurious modes, which may result in an error signal of a three-axis rotation rate sensor in a variety of ways, e.g., could occur due to (resonant) excitation by outside forces (vibration), or due to non-linear crosstalk in the mechanics or the electrostatics of the system. In contrast, if three identical one-axis rotation rate sensors are used, all rotation rate sensors have the same spurious modes, which, due to the process, are at different frequencies, so that overall the number of the spurious modes in a considered frequency range triples. In a multi-axis rotation rate sensor, it is thus possible to continue to achieve a reduction in the spurious modes by designing the same detection structures in each case to be sensitive for more than just one measuring axis.

According to one preferred refinement, the rotatorily drivable first rotation rate sensor unit includes a first rotor unit, which is drivable about the first axis in an oscillating manner, and a second rotor unit, which is drivable about the first axis in an oscillating manner out of phase with the first rotor unit. The first rotor unit is tiltable about the second axis by the first outside rotation rate and about the third axis (x) by the second outside rotation rate, the second rotor unit being tiltable about the second axis by the first outside rotation rate and about the third axis (x) by the second outside rotation rate in anti-parallel to the first rotor unit. The first coupling unit includes a first spring unit, via which the first rotor unit and the second rotor unit are coupled in such a way that a parallel tilting about the second axis is suppressed, and an anti-parallel tilting about the second axis is enabled. Furthermore, a second coupling unit, via which the first rotor unit and the second rotor unit are coupled in such a way that a parallel tilting about the third axis is suppressed and an anti-parallel tilting about the third axis is enabled, a first detection unit for detecting an anti-parallel tilting of the first and second rotor units about the second axis, and a second detection unit for detecting an anti-parallel tilting of the first and second rotor units about the third axis, are provided. Such a first rotation rate sensor unit is manufacturable in a robust manner.

According to one further preferred refinement of the present invention, the linearly drivable second rotation rate sensor unit includes a frame unit including a first frame and a second frame, the second frame being at least partially surrounded by the first frame, the first frame being drivable along the second axis in an oscillating manner, and the second frame being drivable along the second axis in an oscillating manner out of phase with the first frame, and the first and second frames being deflectable about the first axis out of phase by the third outside rotation rate in an oscillating manner along the third axis. Furthermore, a third coupling unit, via which the first frame and the second frame are coupled in such a way that an in-phase deflection of the first and second frames along the third axis is suppressed, and an out-of-phase deflection of the first and second frames along the third axis is enabled, and a third detection unit for detecting an out-of-phase deflection of the first and second frames along the third axis are provided. Such a second rotation rate sensor unit may be coupled easily to the first rotation rate sensor unit.

According to one further preferred refinement of the present invention, the first and second frames are connected to the first and second rotor units via the first coupling unit for driving the first and second rotor units out of phase in an oscillating manner about the first axis. In this way, a simple linear coupling may be implemented.

According to one further preferred refinement of the present invention, a drive frame unit for driving the first and second frame is connected to the first frame and the second frame via a fourth spring unit. In this way, the drive area may be effectively decoupled from the detection area.

According to one further preferred refinement of the present invention, the drive frame unit is connected to the first and second rotor units via the first coupling unit for driving the first and second rotor units about the first axis out of phase in an oscillating manner. In this way, the first rotation rate sensor unit is also decoupled from the linear detection motion.

According to one further preferred refinement of the present invention, the drive frame unit includes a first drive frame and a second drive frame, which are situated on opposing sides of the first frame, and includes a third drive frame, which surrounds the second frame and is at least partially guided over the first frame, the first and second drive frames being connected to the third drive frame via a fifth spring unit. This enables a symmetrical clamping of the first and second frames.

According to one further preferred refinement of the present invention, the drive frame unit includes a first drive frame, which encloses the first frame and the second frame in a U-shaped manner, and includes a second drive frame, which is inserted in a fork-like manner between the first frame and the second frame, the first and second drive frames being connected via a sixth spring unit. This simplifies the manufacturing process.

According to one further preferred refinement of the present invention, the first coupling unit includes a first web and a second spring unit, which connect the first frame to the first rotor unit, the first coupling unit including a second web and a third spring unit. In this way, an effective linear coupling may be achieved.

According to one further preferred refinement of the present invention, the first coupling unit includes a third web and a fourth web, which are connected to the first spring unit. In this way, an effective coupling with respect to the anti-symmetrical behavior may be achieved.

According to one further preferred refinement of the present invention, the second coupling unit includes a first rocker, which is connected to the first and second rotor units via a seventh spring unit, and includes a second rocker, which is connected to the first and second rotor units via an eighth spring unit. This further improves the coupling between the rotor units.

According to one further preferred refinement of the present invention, the third coupling unit includes a ninth spring unit including a multitude of springs. Such springs are easily manufacturable and may be easily matched to the required properties.

According to one further preferred refinement of the present invention, the first detection unit and the second detection unit each include a multitude of capacitive plate electrodes, which are situated beneath the first and second rotor units. This ensures a reliable detection of the tilting of the rotor units.

According to one further preferred refinement of the present invention, the third detection unit includes a multitude of capacitive comb electrodes, which are situated within the first and second frames. Such drives are particularly reliable and robust.

BRIEF DESCRIPTION OF THE DRAWINGS

Further features and advantages of the present invention are elucidated hereafter based on specific embodiments with reference to the figures.

FIGS. 3a) through 3c) show schematic planar representations to explain a spring coupling unit for the micromechanical rotation rate sensor system according to the present invention.

FIGS. 4a) through 4c) show schematic planar representations to explain a further spring coupling unit for the micromechanical rotation rate sensor system according to the present invention.

FIGS. 5a) through 5c) show schematic planar representations to explain different spring suspension units for the micromechanical rotation rate sensor system according to the present invention.

DETAILED DESCRIPTION OF EXAMPLE EMBODIMENTS

In the figures, identical reference numerals denote identical or functionally equivalent elements.

Figure 1:
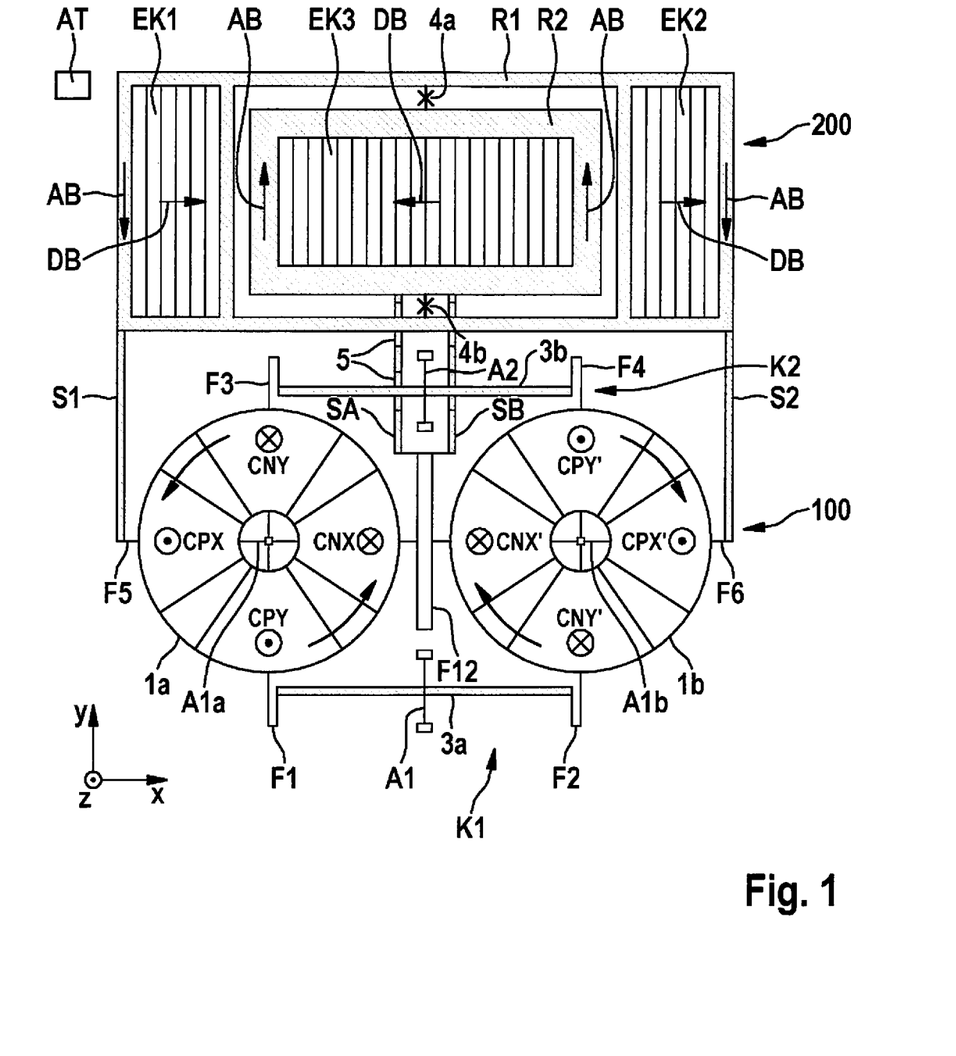
FIG. 1 shows a schematic planar representation to explain a micromechanical rotation rate sensor system according to one first specific embodiment of the present invention.

FIG. 1 shows a schematic planar representation to explain a micromechanical rotation rate sensor system according to one first specific embodiment of the present invention.

In FIG. 1, reference numeral 100 denotes a first rotation rate sensor unit drivable rotatorily about a first axis (z axis) in an oscillating manner for detecting a first outside rotation rate about a second axis (y axis) and a second outside rotation rate about a third axis (x axis). The first, second and third axes (z, y, x) are situated perpendicularly to one another.

The rotatorily drivable first rotation rate sensor unit 100 includes a first rotor unit 1a, which is drivable about the first axis (z axis) in an oscillating manner, and a second rotor unit 1b, which is drivable about the first axis (z axis) in an oscillating manner out of phase with the first rotor unit 1a.

In the present first specific embodiment, first rotor unit 1a and second rotor unit 1b have a disk-shaped design, an associated first and/or second suspension unit A1a, A1b being situated and anchored in a respective central recess.

First rotor unit 1a is tiltable about the second axis (y axis) by the first outside rotation rate and about the third axis (x axis) by the second outside rotation rate. Second rotor unit 1b is tiltable about the second axis (y axis) by the first outside rotation rate and about the third axis (x axis) by the second outside rotation rate in anti-parallel to first rotor unit 1a.

First and second rotor units 1a, 1b are coupled in such a way via first spring unit F12 that a parallel tilting about the second axis (y axis) is suppressed, and an anti-parallel tilting about the second axis (y axis) is enabled, and in particular due to an anisotropic spring constant.

Spring unit F12 is moreover an integral part of a first coupling unit, which connects first rotation rate sensor unit 100 to a second rotation rate sensor unit 200, which is described in detail below.

Furthermore, a second coupling unit K1, K2 is provided, via which first rotor unit 1a and second rotor unit 1b are coupled in such a way that a parallel tilting about the third axis (x axis) is suppressed, and an anti-parallel tilting about the third axis (x axis) is enabled, and in particular also due to an anisotropic spring constant of second coupling unit K1, K2.

Second coupling unit K1, K2 includes a first portion K1 including a first rocker 3a, which is connected on both sides to first and second rotor units 1a, 1b via a respective spring unit F1, F2. First rocker 3a includes a first elastic suspension A1, which is anchored at a substrate (not shown).

Furthermore, second coupling unit K1, K2 includes a second portion K2 including a second rocker 3b, which is connected to first and second rotor units 1a, 1b via a respective spring unit F3, F4. Second rocker 3b includes a second elastic suspension A2, which is anchored at the substrate (not shown).

A first detection unit CPY, CNY, CPY', CNY' is used to detect an anti-parallel tilting of first and second rotor units 1a, 1b about the second axis (y axis). A second detection unit CPX, CNX, CPX', CNX' is used to detect an anti-parallel tilting of first and second rotor units 1a, 1b about the third axis (x axis).

First detection unit CPY, CNY, CPY', CNY' and second detection unit CPX, CNX, CPX', CNX', for example, include a respective multitude of capacitive plate electrodes, which are situated beneath first and second rotor units 1a, 1b, as is schematically indicated by respective circles in FIG. 1.

Reference numeral 200 denotes a second rotation rate sensor unit drivable in a linearly oscillating manner along the second axis (y axis) for detecting a third outside rotation rate about the first axis (z axis), which is connected to first rotation rate sensor unit 100 via first coupling unit S1, F5, S2, F6, SA, SB, F12 for driving first rotation rate sensor unit 100 in an oscillating manner about the first axis (z axis), spring unit F12, as was already mentioned above, at the same time forming a coupling unit between first rotor unit 1a and second rotor unit 1b.

The linearly drivable second rotation rate sensor unit 200 already mentioned above includes a frame unit R1, R2 including a first frame R1 and a second frame R2, second frame R2 being completely surrounded by first frame R1 or being situated in a recess of first frame R1.

Via a drive unit indicated only schematically by reference sign AT, first frame R1 is drivable along the second axis (y axis) in an oscillating manner, and second frame R2 is drivable along the second axis (y axis) in an oscillating manner out of phase with first frame R1. The arrows bearing reference sign AB indicate the respective drive motions of first frame R1 and second frame R2. This drive unit AT is a comb electrode drive, for example, which is known per se.

First frame R1 and second frame R2 are deflectable by the third outside rotation rate about the first axis (z axis) out of phase along the third axis (x axis) in an oscillating manner, which is illustrated by the arrows bearing reference sign DB as the detection motion.

First frame R1 and second frame R2 are coupled via a third coupling unit including springs 4a, 4b in such a way that an in-phase deflection of first and second frames R1, R2 along the third axis (x axis) is suppressed, and an out-of-phase deflection of first and second frames R1, R2 along the third axis (x axis) is enabled. These special springs 4a, 4b also have an anisotropic spring constant and are described in greater detail hereafter.

As was already mentioned above, first and second frames R1, R2 are connected to first and second rotor units 1a, 1b via first coupling unit S1, F5, S2, F6, SA, SB, F12 for driving first and second rotor units 1a, 1b about the first axis (z axis) out of phase in an oscillating manner, spring unit F12 also preferably enabling an anti-parallel tilting of first and second rotor units 1a, 1b about the second axis (y axis). Drive unit AT thus serves as a shared drive unit for first and second rotation rate sensor units 100, 200.

This first coupling unit includes, in particular, a first web S1 and a further spring unit F5, which connect first frame R1 to first rotor unit 1a, and a second web S2 and a third spring unit F6, which connect first frame R1 to second rotor unit 1b. In this example, first and second webs S1, S2 directly adjoin the short sides of first frame R1.

The first coupling unit furthermore includes a third web SA and a fourth web SB, which connect second frame R2 to first and second rotor units 1a, 1b via spring unit F12.

Since second frame R2 is completely surrounded by first frame R1, the two webs SA, SB, at least in the areas denoted by reference numeral 5, have to extend in a lower plane than first frame R1 and second rocker 3b. This may be achieved, for example, by appropriate etched recesses.

Finally, a third detection unit EK1, EK2, EK3 is provided at second rotation rate sensor unit 200 for detecting an out-of-phase deflection of first and second frames R1, R2 along the third axis (x axis) (detection motion DB).

In the present first specific embodiment, third detection unit EK1, EK2, EK3 includes a first multitude of capacitive comb electrodes EK1, a second multitude of capacitive comb electrodes EK2, and a third multitude of capacitive comb electrodes EK3.

The first multitude of capacitive comb electrodes EK1 and the second multitude of capacitive comb electrodes EK2 are situated in accordingly recessed areas of first frame R1, and in particular in opposing boundary areas of first frame R1, the third multitude of capacitive comb electrodes EK3 being situated within a recess of second frame R2. For the sake of a simplified illustration, the respective capacitive counter electrodes anchored in the substrate (not shown) are not shown.

Advantageously, the masses of first frame R1 and of second frame R2 are identical, and the geometry is axially symmetrical to the second axis (y axis) and third axis (x axis) due to the shared center of mass. Such a design makes the micromechanical rotation rate sensor system extremely robust against outside linear and rotational acceleration, i.e., linear or rotational accelerations do not supply a detection signal.

Figure 2:
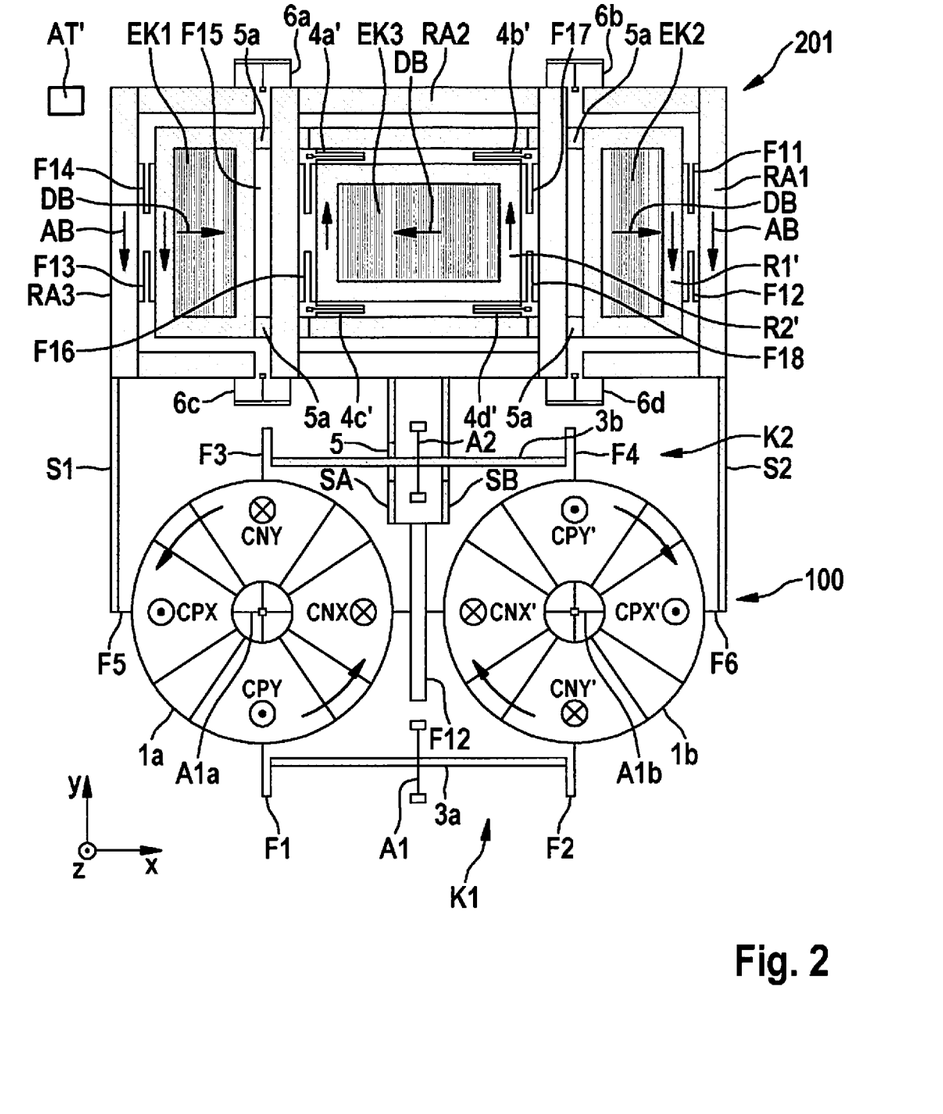
FIG. 2 shows a schematic planar representation to explain a micromechanical rotation rate sensor system according to one second specific embodiment of the present invention.

FIG. 2 shows a schematic planar representation to explain a micromechanical rotation rate sensor system according to one second specific embodiment of the present invention.

In the second specific embodiment, first rotation rate sensor unit 100 is designed similarly to the above-described first specific embodiment, whereas second rotation rate sensor unit 201 differs from the above-described rotation rate sensor unit 200 of the first specific embodiment.

The linearly drivable second rotation rate sensor unit 201 also includes a first frame R1' and a second frame R2', which are designed similarly to the above-described first frame R1 and second frame R2.

In contrast to the first specific embodiment, third coupling unit 4a' through 4d', via which first frame R1' and second frame R2' are coupled, includes four anisotropic springs 4a', 4b', 4c', 4d, which, as was already mentioned, preferably enable an asymmetrical deflection of first frame R1' and of second frame R2'.

Compared to the first specific embodiment, a drive frame unit RA1, RA2, RA3 is additionally provided in the second specific embodiment for linearly driving first frame R1' and second frame R2' out of phase, which is connected to first frame R1' and second frame R2' via a fourth spring unit including spring elements F11 through F18.

Drive frame unit RA1, RA2, RA3 is only movable in the direction of drive motion AB, whereas first frame R1' and second frame R2' are movable both in the direction of drive motion AB and in the direction of detection motion DB. A drive unit AT' for drive frame unit RA1, RA2, RA3 is shown only schematically with reference sign AT' and may, as mentioned above, be implemented by electrostatic drive combs, for example.

In particular, drive frame unit RA1, RA2, RA3 includes a first, second and third drive frame RA1, RA2, RA3. First drive frame RA1 and third drive frame RA3 are situated on opposing narrow sides of first frame R1' in a U-shaped manner. Third drive frame RA3 surrounds second frame R2' and is partially guided over first frame R1' in the areas denoted by 5a. First drive frame RA1 and third drive frame Ra3 are connected to second drive frame RA2 via a fifth spring unit 6a through 6d including anisotropic springs 6a, 6b, 6c, 6d.

In contrast to the above-described first specific embodiment, drive frame unit RA1, RA2, RA3 in the second specific embodiment is connected to first and second rotor units 1a, 1b via first coupling unit S1, F5, S2, F6, SA, SB, F12 for driving first and second rotor units 1a, 1b about the first axis (z axis) out of phase in an oscillating manner.

Webs S2, S1 are connected to first and third drive frame RA3 and RA1, whereas webs SA, SB are connected to second drive frame RA2.

Figure 3:
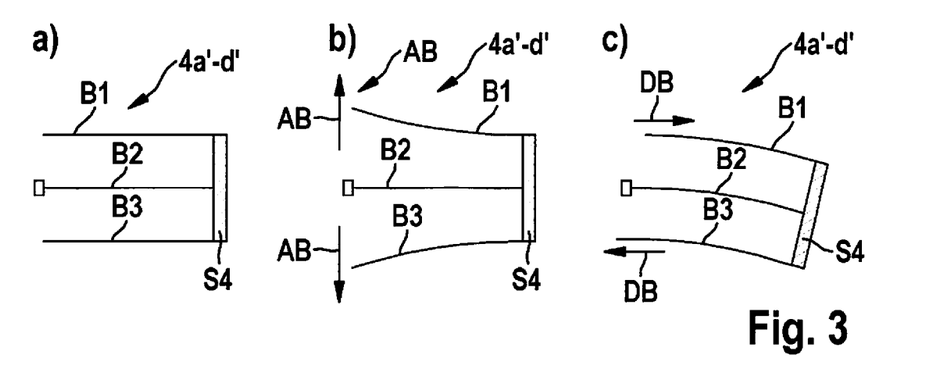

FIGS. 3a) through 3c) show schematic planar representations to explain a spring coupling unit for the micromechanical rotation rate sensor system according to the present invention.

In particular, FIGS. 3a) through 3c) show an enlarged illustration of anisotropic springs 4a' through 4d' of the third coupling unit according to FIG. 2.

Springs 4a' through 4d' include a first, second and third elastic thin web B1, B2, B3 and a rigid wider connecting web SG. First web B1 is connected to first frame R1', whereas third web B3 is connected to second frame R2'. Second web B2 is anchored on the substrate (not shown). FIG. 3a) shows the non-deflected state, whereas FIG. 3b) shows the deflected state during drive motion AB, and FIG. 3c) shows the deflected state during detection motion DB.

Figure 4:
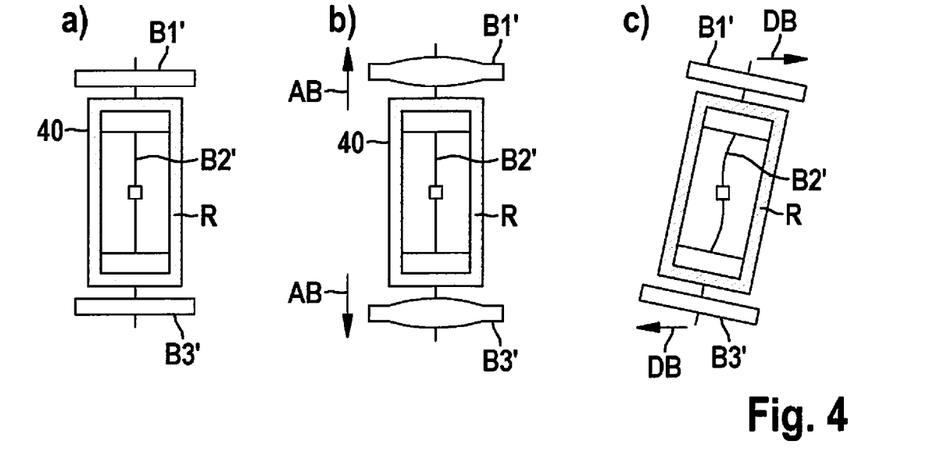

FIGS. 4a) through 4c) show schematic planar representations to explain a further spring coupling unit for the micromechanical rotation rate sensor system according to the present invention.

In particular, anisotropic spring 40 includes a rigid wide frame R, to which a first elastic thinner web B1', a second elastic thinner web B2' and a third elastic thinner web B3' are coupled. First elastic web B1' is connected to first frame R1', second elastic web B2' is connected to the substrate (not shown) and the interior of frame R, and third elastic web B3' is connected to second frame R2'. Similarly to FIGS. 3b), 3c), FIGS. 4b), 4c) show the deflected state during drive motion AB and during detection motion DB.

Figure 5:
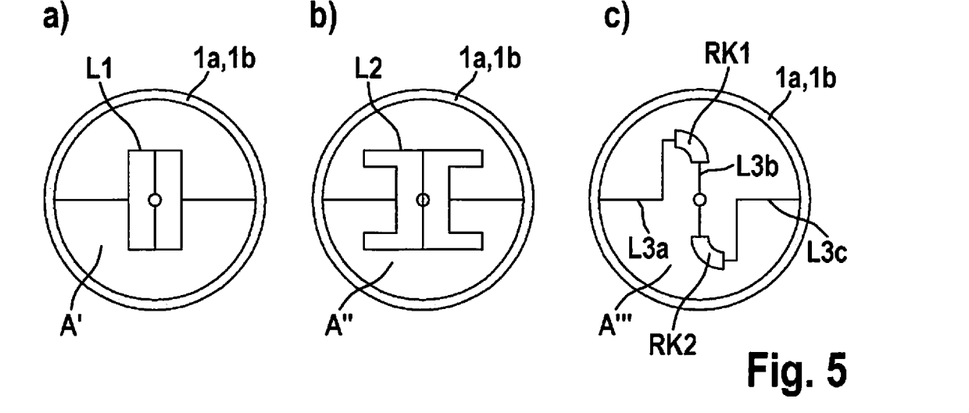

FIGS. 5a) through 5c) show schematic planar representations to explain different spring suspension units for the micromechanical rotation rate sensor system according to the present invention.

FIGS. 5a) through 5c), in particular, show three different embodiments A', A" and A'" of first and second suspension unit A1a, A1b of first and second rotor units 1a, 1b.

The first embodiment includes a first folded spring L1, which is able to rotate about the first axis (z axis) and able to tilt about the second axis (y axis) and third axis (x axis).

The second embodiment includes a differently folded spring L2, which has the same mechanical properties.

Third embodiment A1'" includes a combination of elastic springs L3a, L3b, L3c, which are connected to one another by rigid curved arch elements RK1, RK2. Third embodiment A1'" is also able to rotate about the first axis (z axis) and tilt about the second axis (y axis) and third axis (x axis).

Suspension units A', A", A'" are each centrally anchored at the substrate (not shown).

Figure 6:
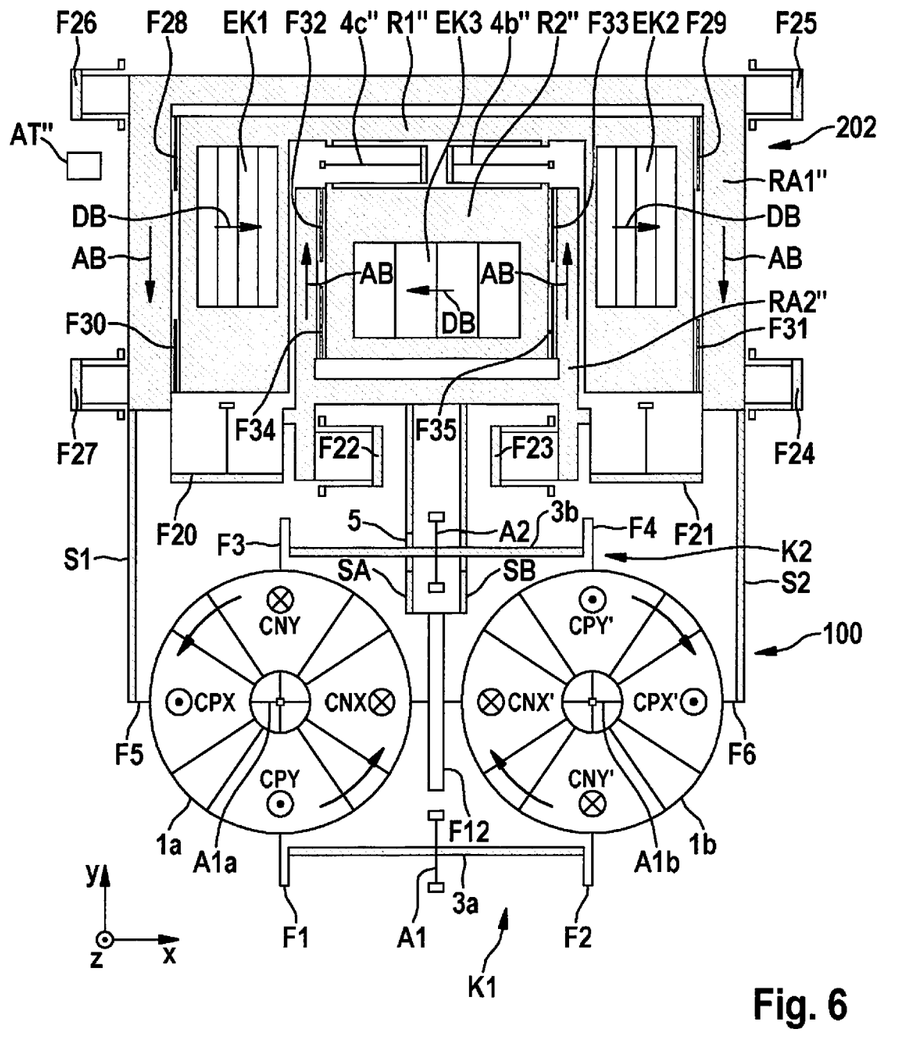
FIG. 6 shows a schematic planar representation to explain a micromechanical rotation rate sensor system according to one third specific embodiment of the present invention.

FIG. 6 shows a schematic planar representation to explain a micromechanical rotation rate sensor system according to one third specific embodiment of the present invention.

As with the second specific embodiment, in the third specific embodiment only second rotation rate sensor unit 202 differs from the above-described second rotation rate sensor units 200, 201.

First rotation rate sensor unit 100 is configured as with the first and second specific embodiments.

In particular, second rotation rate sensor unit 202 according to the third specific embodiment includes a first frame R1" and a second frame R2", which are connected to one another via third coupling unit 4a", 4b" (cf. FIGS. 3a) through 3c)).

First frame R1" has a U-shaped configuration, and second frame R2" is suspended thereon in the U-shaped recess via springs 4a", 4b" of the third coupling unit. Frames R1", R2" are able to move both in the direction of drive motion AB and in the direction of detection motion DB.

A drive frame unit RA1", RA2" is provided, which includes a first drive frame RA1", which encloses first frame R1" and second frame R2" in a U-shaped manner. Furthermore, a second drive frame RA2" is provided, which is inserted in a fork-like manner between first frame R1" and second frame R2", first and second drive frames RA1", RA2" being connected to one another via anisotropic springs F20, F21.

First drive frame RA1" is additionally connected to the substrate (not shown) via anisotropic springs F24, F25, F26, F27. Second drive frame RA2" is additionally connected to the substrate (not shown) via springs F22, F23. Drive unit AT'" for first drive frame RA1" and second drive frame RA2" is again only shown schematically for the sake of clarity.

First drive frame RA1" is connected to first frame R1" via springs F28, F29, F30, F31, and second drive frame RA2" is connected to second frame R2" via springs F32, F33, F34, F35.

In this specific embodiment, webs S1, S2 are connected to first drive frame RA1", whereas webs SA, SB are connected to second drive frame RA2".

In the third specific embodiment, first frame R1" and first drive frame RA1" are U-shaped, and as a result, it is not necessary to provide an underpass area (see area 5 above) for webs SA, SB, which simplifies the manufacture.

Underpass area 5 only has to be provided between webs SA, SB and second rocker 3b.

Otherwise, the function and the design of the third specific embodiment are similar to the above-described first and second specific embodiments.

Figure 7:
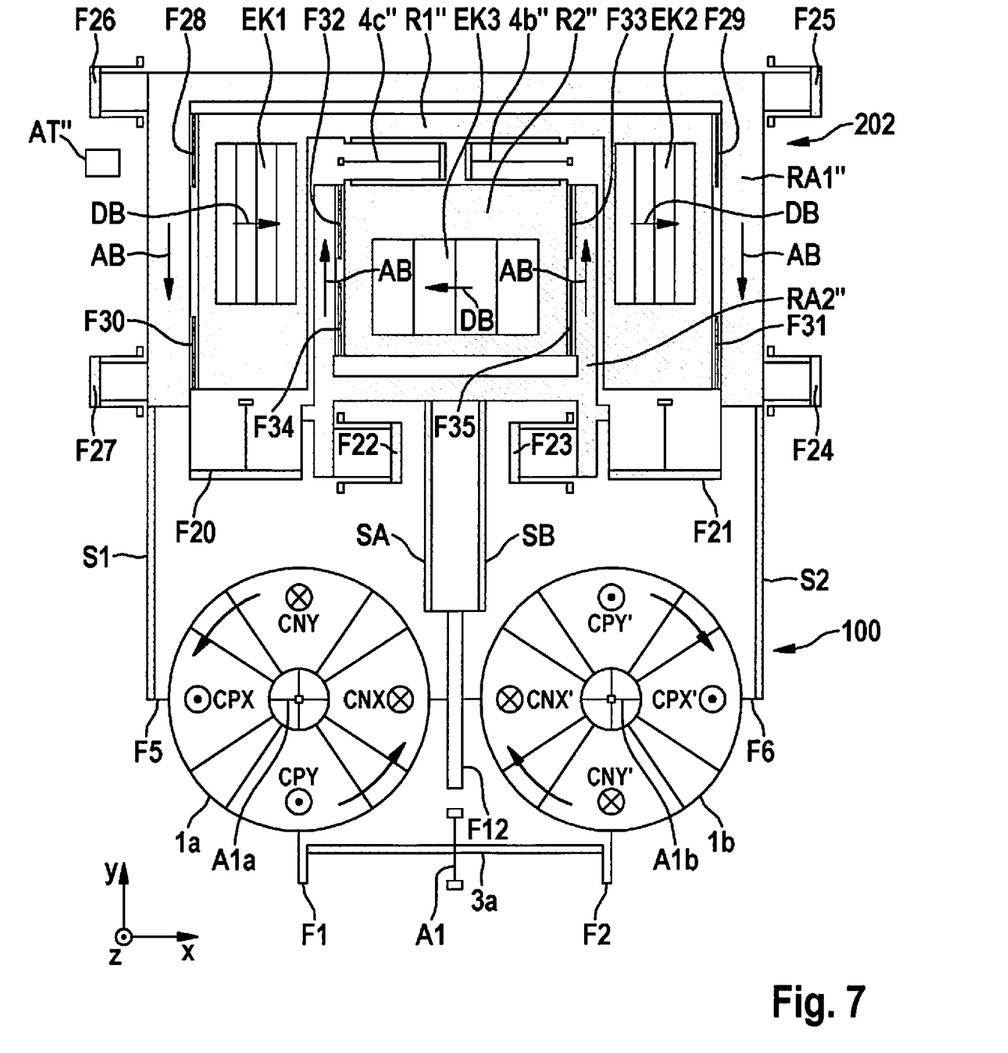
FIG. 7 shows a schematic planar representation to explain a micromechanical rotation rate sensor system according to one fourth specific embodiment of the present invention.

FIG. 7 shows a schematic planar representation to explain a micromechanical rotation rate sensor system according to one fourth specific embodiment of the present invention.

Second rocker 3b including suspension A2 and springs F3, F4 is omitted in the fourth specific embodiment, so that underpass area 5 may also be omitted in this area.

The advantage of this fourth specific embodiment is that no underpasses or crossings are necessary, and thus a mechanical layer may be dispensed with.

However, the rotational acceleration robustness is reduced in the fourth specific embodiment. Nonetheless, the sensitivity to rotational accelerations is lower with mutually engaging suboscillators than with suboscillators situated next to one another since the distances of the masses from the shared center of gravity are reduced.

Although the present invention has been described based on preferred exemplary embodiments, it is not limited thereto. In particular, the described materials and topologies are shown only by way of example and not limited to the described examples.

In further specific embodiments not shown, the first rocker including the anchoring and connection to the rotating masses may also be dispensed with, or the coupling spring unit between the rotor units may also be dispensed with.

In addition, the geometry and symmetry of the shown first and second rotation rate sensor units are only provided by way of example in the above specific embodiments and may be varied as needed.

What is claimed is:

1. A micromechanical rotation rate sensor system, comprising:
   a first rotation rate sensor unit drivable rotatorily about a first axis in an oscillating manner for detecting a first outside rotation rate about a second axis and a second outside rotation rate about a third axis, the first axis, the second axis, and third axis being situated perpendicularly to one another; and
   a second rotation rate sensor unit drivable linearly along the second axis in a linearly oscillating manner by a drive unit for detecting a third outside rotation rate about the first axis;
   wherein the second rotation rate sensor unit is connected to the first rotation rate sensor unit via a first coupling unit for driving the first rotation rate sensor unit by the drive unit wherein the rotatorily drivable first rotation rate sensor unit includes:
   a first rotor unit which is drivable about the first axis in an oscillating manner;
   a second rotor unit which is drivable about the first axis in an oscillating manner out of phase with the first rotor unit, the first rotor unit being tiltable about the second axis by the first outside rotation rate and about the third axis by the second outside rotation rate, and the second rotor unit being tiltable about the second axis by the first outside rotation rate and about the third axis by the second outside rotation rate in anti-parallel to the first rotor unit, the first coupling unit including a first spring unit via which the first rotor unit and the second rotor unit are coupled in such a way that a parallel tilting about the second axis is suppressed, and an anti-parallel tilting about the second axis is enabled;
   a second coupling unit via which the first rotor unit and the second rotor unit are coupled in such a way that a parallel tilting about the third axis is suppressed, and an anti-parallel tilting about the third axis is enabled.

2. The micromechanical rotation rate sensor system as recited in claim 1, wherein the rotatorily drivable first rotation rate sensor unit further includes:
   a first detection unit configured to detect an anti-parallel tilting of the first and second rotor units about the second axis; and
   a second detection unit configured to detect an anti-parallel tilting of the first rotor unit and the second rotor unit about the third axis.

3. The micromechanical rotation rate sensor system as recited in claim 2, wherein the linearly drivable second rotation rate sensor unit includes:
   a frame unit including a first frame and a second frame, the second frame being at least partially surrounded by the first frame, the first frame being drivable along the second axis in an oscillating manner, and the second frame being drivable along the second axis in an oscillating manner out of phase with the first frame, the first frame and the second frame being deflectable about the first axis by the third outside rotation rate out of phase along the third axis in an oscillating manner;
   a third coupling unit via which the first frame and the second frame are coupled in such a way that an in-phase deflection of the first frame and the second frame along the third axis is suppressed, and an out-of-phase deflection of the first frame and the second frame along the third axis is enabled; and
   a third detection unit configured to detect an out-of-phase deflection of the first frame and the second frame along the third axis.

4. The micromechanical rotation rate sensor system as recited in claim 3, wherein the first frame and the second frame are connected to the first rotor unit and the second rotor unit via the first coupling unit for driving the first rotor unit and the second rotor unit about the first axis out of phase in an oscillating manner.

5. The micromechanical rotation rate sensor system as recited in claim 3, wherein a drive frame unit, for driving the first frame and the second frame, is connected to the first frame and the second frame via a first spring unit.

6. The micromechanical rotation rate sensor system as recited in claim 5, wherein the drive frame unit is connected to the first rotor unit and the second rotor unit via the first coupling unit for driving the first rotor unit and the second rotor unit about the first axis out of phase in an oscillating manner.

7. The micromechanical rotation rate sensor system as recited in claim 5, wherein the drive frame unit includes a first drive frame and a second drive frame which are situated on opposing sides of the first frame, and includes a third drive frame, which surrounds the second frame and is at least partially guided over the first frame, the first drive frame and the second drive frame being connected to the third drive frame via a second spring unit.

8. The micromechanical rotation rate sensor system as recited in claim 5, wherein the drive frame unit includes a first drive frame, which encloses the first frame and the second frame in a U-shaped manner, and includes a second drive frame, which is inserted in a fork-like manner between the first frame and the second frame, the first drive frame and the second drive frame being connected via a second spring unit.

9. The micromechanical rotation rate sensor system as recited in claim 4, wherein the first coupling unit includes a first web and a second spring unit, which connect the first frame to the first rotor unit, and the first coupling unit includes a second web and a third spring unit.

10. The micromechanical rotation rate sensor system as recited in claim 9, wherein the first coupling unit includes a third web and a fourth web, which are connected to the first spring unit.

11. The micromechanical rotation rate sensor system as recited in claim 2, wherein the second coupling unit includes a first rocker, which is connected to the first rotor unit and the second rotor unit via a second spring unit, and includes a second rocker, which is connected to the first and second rotor units via a third spring unit.

12. The micromechanical rotation rate sensor system as recited in claim 3, wherein the third coupling unit includes a second spring unit including a multitude of springs.

13. The micromechanical rotation rate sensor system as recited in claim 2, wherein the first detection unit and the second detection unit each include a respective multitude of capacitive plate electrodes, which are situated beneath the first rotor unit and the second rotor unit.

14. The micromechanical rotation rate sensor system as recited in claim 3, wherein the third detection unit includes a plurality of capacitive comb electrodes, which are situated within the first frame and the second frame.

15. A manufacturing method for a micromechanical rotation rate sensor system, the method including the following steps:
   forming a first rotation rate sensor unit drivable rotatorily about a first axis in an oscillating manner for detecting a first outside rotation rate about a second axis and a second outside rotation rate about a third axis, the first axis, the second axis and the third axis being situated perpendicularly to one another;
   forming a second rotation rate sensor unit drivable in a linearly oscillating manner along the second axis for detecting a third outside rotation rate about the first axis; and
   connecting the second rotation rate sensor unit to the first rotation rate sensor unit via a first coupling unit for driving the first rotation rate sensor unit about the first axis in an oscillating manner, wherein the rotatorily drivable first rotation rate sensor unit includes:
   a first rotor unit which is drivable about the first axis in an oscillating manner;
   a second rotor unit which is drivable about the first axis in an oscillating manner out of phase with the first rotor unit, the first rotor unit being tiltable about the second axis by the first outside rotation rate and about the third axis by the second outside rotation rate, and the second rotor unit being tiltable about the second axis by the first outside rotation rate and about the third axis by the second outside rotation rate in anti-parallel to the first rotor unit, the first coupling unit including a first spring unit via which the first rotor unit and the second rotor unit are coupled in such a way that a parallel tilting about the second axis is suppressed, and an anti-parallel tilting about the second axis is enabled;
   a second coupling unit via which the first rotor unit and the second rotor unit are coupled in such a way that a parallel tilting about the third axis is suppressed, and an anti-parallel tilting about the third axis is enabled.

* * * * *

UNITED STATES PATENT AND TRADEMARK OFFICE
CERTIFICATE OF CORRECTION

| | |
|---|---|
| PATENT NO. | : 11,226,202 B2 |
| APPLICATION NO. | : 16/640882 |
| DATED | : January 18, 2022 |
| INVENTOR(S) | : Odd-Axel Pruetz et al. |

It is certified that error appears in the above-identified patent and that said Letters Patent is hereby corrected as shown below:

On the Title Page

In Item (72) Inventors, replace:
"Andreas Lassi"
With:
--Andreas Lassl--

Signed and Sealed this
Twenty-first Day of June, 2022

Katherine Kelly Vidal
*Director of the United States Patent and Trademark Office*